US008195968B2

(12) United States Patent
Rothman et al.

(10) Patent No.: US 8,195,968 B2
(45) Date of Patent: *Jun. 5, 2012

(54) SYSTEM AND METHOD FOR POWER REDUCTION BY SEQUESTERING AT LEAST ONE DEVICE OR PARTITION IN A PLATFORM FROM OPERATING SYSTEM ACCESS

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/384,552

(22) Filed: Apr. 6, 2009

(65) Prior Publication Data
US 2010/0095140 A1    Apr. 15, 2010

Related U.S. Application Data

(63) Continuation of application No. 11/241,275, filed on Sep. 29, 2005, now Pat. No. 7,516,336.

(51) Int. Cl.
*G06F 1/32* (2006.01)
*G06F 1/00* (2006.01)
*G06F 9/00* (2006.01)

(52) U.S. Cl. ............... 713/320; 713/300; 713/1
(58) Field of Classification Search ............... 713/300
See application file for complete search history.

(56) References Cited

U.S. PATENT DOCUMENTS

| 6,094,699 A * | 7/2000 | Surugucchi et al. ......... 710/314 |
| 6,202,153 B1 * | 3/2001 | Diamant et al. ............... 726/35 |
| 6,717,520 B1 * | 4/2004 | Dorenbosch ............... 340/636.1 |
| 7,516,336 B2 * | 4/2009 | Rothman et al. ............. 713/300 |
| 7,564,810 B2 * | 7/2009 | Hernandez et al. .......... 370/311 |
| 7,802,081 B2 * | 9/2010 | Schultz et al. .................... 713/1 |
| 7,810,083 B2 | 10/2010 | Chinya et al. |
| 2005/0289283 A1 * | 12/2005 | Warrier et al. .................... 711/1 |
| 2006/0156399 A1 | 7/2006 | Parmar et al. |
| 2007/0006231 A1 | 1/2007 | Wang et al. |

* cited by examiner

*Primary Examiner* — Suresh Suryawanshi
(74) *Attorney, Agent, or Firm* — D'Ann Naylor Rifai (57) ABSTRACT

In some embodiments, the invention involves a system and method relating to managing power utilization in partitioned systems. In at least one embodiment, the present invention is intended to control the sleeping/wakefulness of devices, as necessary, to minimize power utilization of devices whose accesses are routed away. Inter-partition communication is used to utilize devices in a sequestered partition while devices in the OS partition are put into a sleep state to save power. Other embodiments are described and claimed.

19 Claims, 5 Drawing Sheets

SYSTEM AND METHOD FOR POWER REDUCTION BY SEQUESTERING AT LEAST ONE DEVICE OR PARTITION IN A PLATFORM FROM OPERATING SYSTEM ACCESS

CROSS REFERENCE TO RELATED APPLICATION

This application is a continuation of U.S. patent application Ser. No. 11/241,275, filed Sep. 29, 2005, entitled "System and Method For Power Reduction By Sequestering At Least One Devise Or Partition In A Platform From Operating System Access" This application is entirely incorporated by reference.

FIELD OF THE INVENTION

An embodiment of the present invention relates generally to multi-processor or multi-core computing devices and, more specifically, to managing power utilization in partitioned systems.

BACKGROUND

Various mechanisms exist for power management in a platform. However, existing power management techniques require a process or agent to have access to all components to be managed.

Existing multi-processor platforms may have processors, devices and/or memory partitioned. One platform may then behave as two computing devices. A platform may have multiple processors with hardware partitioning so that the platform may act as multiple machines with multiple operating systems. There may be only a single motherboard on the platform.

Power utilization of platforms is becoming more important. It is desirable to minimize or optimize the power that a platform or set of platforms utilize. As partitioning becomes more prevalent, it may become desirable to manage the power utilization of the various partitions of a system and the system overall.

However, partitioning has traditionally been performed in enterprise-class machines, such as servers, and other large-size deployed machines. Power utilization has become more important as more machines are used in one location. Environmental concerns are now an issue. For instance, it may not be possible to co-locate enough compute power and maintain an appropriately cooled environment. The air conditioning unit may not be able to handle the heat dissipation of that much power utilization. With the multi-core and mini-core deployments planned for the future, many usage models require partitioning. It is becoming more common for platforms to comprise more than one processor. Further, other devices are often present in multiples within the platform.

Portions of a system may be sequestered, for partitioning. Power management in an existing system may use an agent that can monitor the processor burden rate (busy time), control throttling, etc. The agent is typically in control of the platform, but when resources are sequestered, the agent no longer maintains control of the sequestered resources. If the agent cannot see a resource, the agent can no longer manage that resource. Thus, the traditional power management schemes are no longer viable solutions for partitioned platforms with sequestering.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to managing power utilization in partitioned systems. In at least one embodiment, the present invention is intended to control the sleeping/wakefulness of devices, as necessary, to minimize power utilization of devices whose accesses are routed away.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
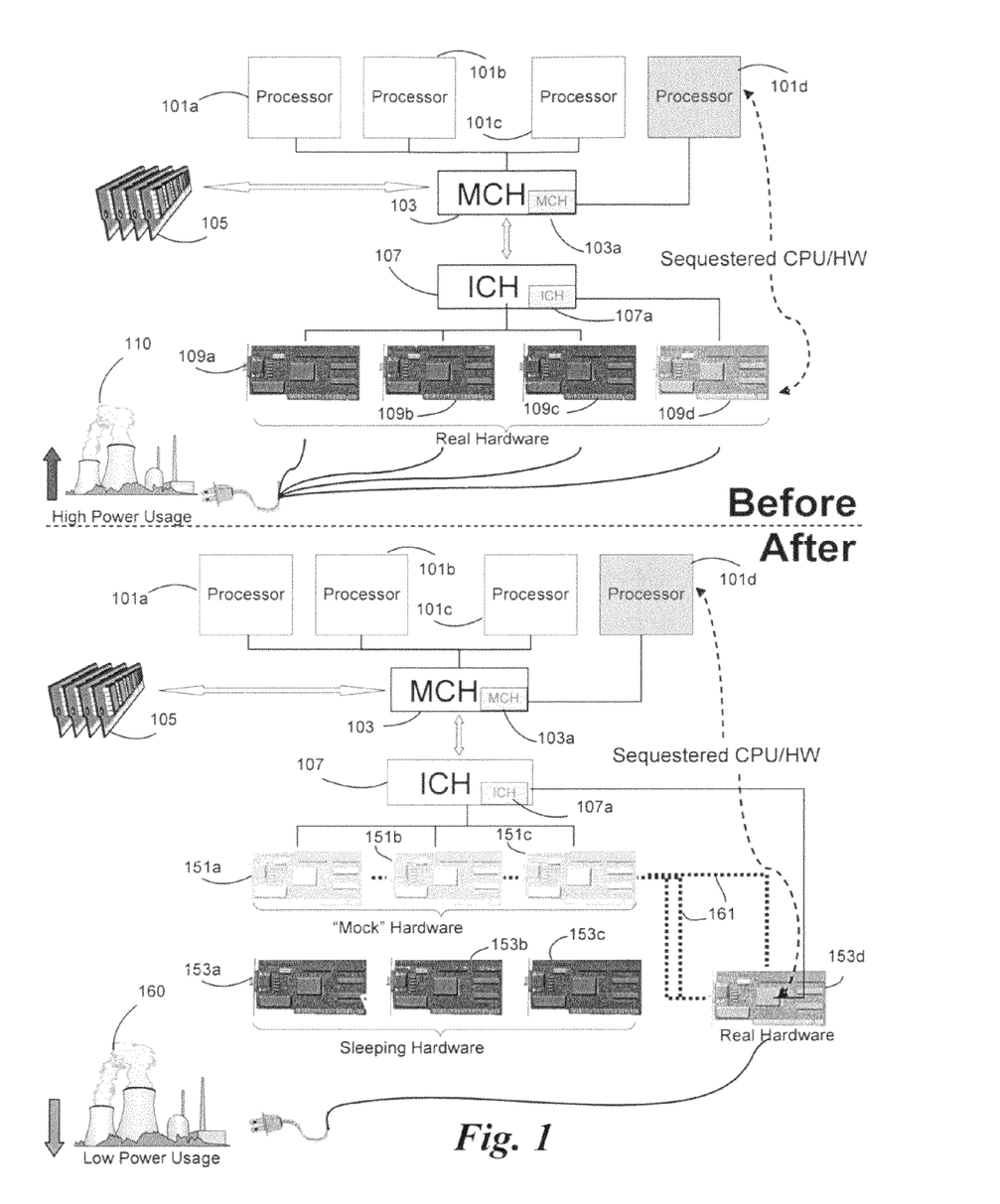
FIG. 1 is a block diagram illustrating a multiprocessor system functioning before and after implementing a power utilization scheme according to an embodiment of the invention.

FIG. 1 is a block diagram illustrating a multiprocessor system functioning before and after implementing a power utilization scheme according to an embodiment of the invention. The top portion of the figure illustrates a typical existing partitioned multi-processor system 100. The bottom portion of the figure illustrates a partitioned multi-processor system 150 according to an embodiment of the invention.

The multi-processor system 100 may comprise four processors 101a, 101b, 101c and 101d. The processors 101a, 101b and 101c may communicate with a memory 105 via a controller hub (MCH) 103. In this example, processor 101d is sequestered and communicates with memory 105 via a sequestered portion of the MCH 103a. The MCH 103 may communicate with hardware devices 109a, 109b and 109c via an input/output (I/O) controller hub (ICH) 107. In this example, the sequestered processor 101d communicates to a sequestered device 109d via sequestered portions of the MCH 103a and ICH 107a. There is no effective way to manage the power utilization with sequestered devices, so this model yields high power usage 110. It will be apparent to one of ordinary skill in the art that various techniques exist to sequester or isolate a processor and/or dedicate hardware devices to the sequestered processor. There may be chipset support for sequestered hardware devices so that the hardware may be treated as an independent entity. A shared chipset may be programmed to know which components are to be controlled. The example of sequestering could as easily have been shown with two processors 101a and 101b being sequestered from processors 101c and 101d.

The MCH 107 and secondary MCH 107a are effectively separate control paths for the different processors, establishing a wall between the processors. The same is true for the ICH 107 and secondary ICH 107a. It will be apparent to one of ordinary skill in the art how to program a chipset with partitioning support to operate as if the chipset has two sets of MCH and ICH components.

Platform resource layer (PRL) technology may be being developed to broaden productization across widely deployed systems for this type of sequestering. With planned upcoming chipset modifications by major manufacturers, this type of partitioning capability may be expanded to multi-processor systems with 32 or more processors. Managing power utilization in such systems is critical.

The ICH 107 may expose a "mock" device 151a, 151b or 151c. The mock devices 151 are sequestered devices. The mock devices 151 do not really exist as hardware, but are used as a means by which an agent can communicate with devices on the other side of the sequester wall. In this exemplary embodiment, mock device 151a represents physical device 153a, mock device 151b represents physical device 153b, and mock device 151c represents physical device 153c. Embodiments of the present invention enable device accesses that are meant for physical devices 153a-c to be routed to physical device 153d when devices 153a-c are in sleep mode. The mock devices 151a-c are used to effect this routing by effectively capturing the device accesses before they are sent to the sleeping devices. In one embodiment, communication is effected by mailboxes. An inter-partition bridge may effect communication among the sequestered devices.

Communication to the partitions may be possible via an inter-partition bridge such as described in co-pending U.S. patent application Ser. No. 11/027,253, entitled "System And Method For Implementing Network Security Using A Sequestered Partition" by Pankaj N. Parmar and Saul Lewites, filed on Dec. 30. 2004.

Communication via an inter-partition bridge may be illustrated in an embodiment of a multi-threaded implementation within an extensible firmware interface (EFI) architecture, but is also applicable to multi-processor or multi-core environments. In one embodiment, prior to handling control over to the operating system (OS) or the OS loader, the EFI sequesters a hyper-thread and a portion of the computer system's Random-Access Memory ("RAM") for its use. The combination of the sequestered hyper-thread and RAM may be referred to herein as a "sequestered partition" or "S-Partition." More generally, the S-Partition may include any set of system resources not accessible to the OS. By contrast, the "OS Partition" includes the OS itself and the computing resources made available to the OS.

Figure 3:
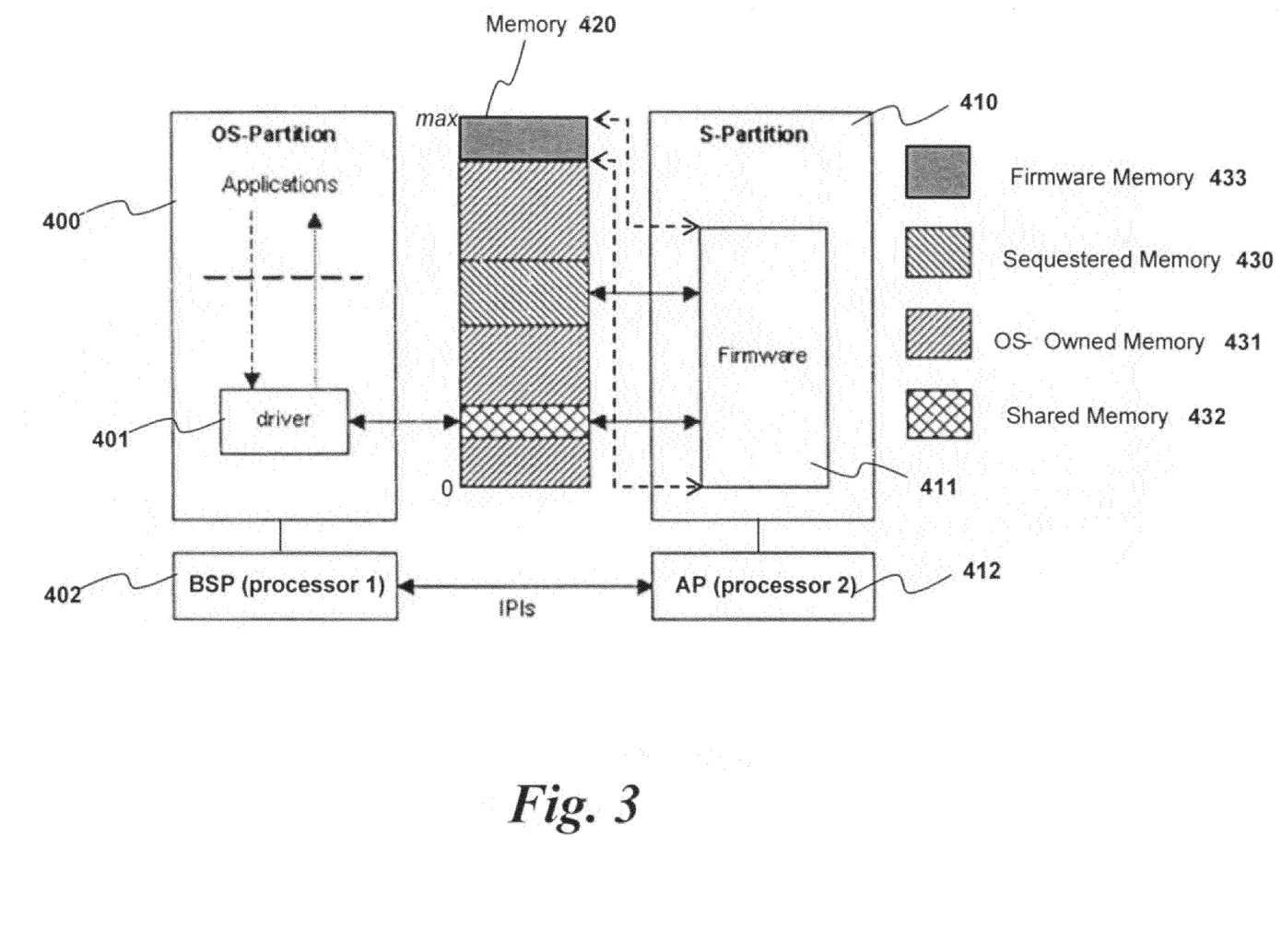
FIG. 3 illustrates an embodiment of the invention which includes an operating system (OS) partition and a sequestered partition.

FIG. 3 illustrates an exemplary OS-Partition 400 communicating with an S-Partition through a shared block of memory 432 in a memory device 420. In one embodiment, the memory device is RAM or synchronous-dynamic RAM (SDRAM). The OS-Partition 400 includes the operating system, potentially one or more applications, a driver 401 to enable communication between the OS-Partition and the S-Partition via the shared memory and a hyper-thread processor 402 (sometimes referred to herein as the bootstrap processor or "BSP"). The S-Partition 410 may include firmware 411 which, as mentioned above, may include EFI-compliant basic input output system (BIOS) code, and a sequestered hyper-thread processor 412 (sometimes referred to below as the application processor or "AP"). A particular region 433 of the memory may be used to store program code and/or data from the firmware 411. This block of memory 433 is initially shared but may eventually become part of the sequestered memory after the OS boots and will not be accessible/visible to the OS.

In an embodiment, the following set of operations are used to establish communication between the OS-Partition 400 and the S-Partition 410:

1. Sequester a Partition

To sequester a partition, a subset of the computer system's resources are segregated from the OS (i.e., set apart from the resources made visible to the OS). The partition may contain one or more physical processors or logical processors, or any combination thereof (e.g., a hyper-thread or other type of logically separable processing element), and enough RAM 430 to run the specialized program code described herein. Note that depending on the application one or more devices such as a Peripheral Component Interconnect (PCI) network adapter may also be included within the partition.

Sequestering of system resources may be performed by the firmware 411 before the OS loads. For example, in one embodiment, RAM is sequestered by manipulating the physical memory map provided to the OS when the OS is booted up. More specifically, in one embodiment, a block of memory 430 is removed from the view of the OS by resizing or removing entries from the memory map. Moreover, in one embodiment, AP 412 (which may be a hyper-thread or a physically distinct processor) is sequestered by modifying the Advanced Configuration and Power Interface (ACPI) table passed to the OS at boot time to exclude the ID of the sequestered AP 412 and its Advanced Programmable Interrupt Controller (APIC) from the table. For processors that support hyper-threading, concealing a physical core includes excluding both of its hyper-threads from the ACPI table.

2. Load Specialized Code on the Sequestered Processor and Boot the OS

During platform initialization, the firmware 411 is executed on a single logical processor, i.e., the BSP 402. All other hyper-threads or cores are either halted or waiting for instructions. Prior to booting the OS, the processor 402 indicates to the sequestered processor, i.e., the AP 412 to start executing the specialized code which is pre-loaded into the sequestered block of RAM 430. In one embodiment, the specialized code waits for an OS-resident driver 401 to define the shared memory area 432, where data exchange between the two partitions 400, 410 will occur. The firmware 411 then disables all interrupts. In one embodiment, it does this by raising the task priority level (TPL) and loading the OS. Raising the TPL is typically as good as disabling the interrupts. This means while the OS is booting, it does not want to get interrupted by devices. Once the OS is ready to service interrupts, the TPL is restored.

3. Establish a Communication Link

As mentioned above, communication between the OS-Partition 400 and the S-Partition 410 may be accomplished using a customized kernel driver 401. In one embodiment, the OS loads the driver 401 as a result of detecting a particular device on the PCI bus such as a network interface card (NIC), or through manual installation of a virtual device such as a virtual miniport. The former case involves replacing the NIC device's standard driver with a modified version that "talks"

to the S-partition instead of talking directly to the NIC device. The latter case precludes the need for a physical device.

Once loaded, the driver registers an interrupt with the OS, extracts its interrupt vector, allocates a non-pageable shared region of memory 432, stores the interrupt vector in it, and marks the beginning of the segment with a unique multi-byte signature. In one embodiment, the specialized program code running on the AP 412 within the S-Partition 410 continuously scans the memory 420 for this signature. Once found, it extracts the interrupt vector of the OS-resident driver 401 and stores its own interrupt vector to enable inter-partition communication.

In one embodiment, the signature is a 16 byte pattern, although the underlying principles are not limited to any particular byte length or pattern. Scanning may be performed by first reading bytes 0-15 and comparing them to the previously agreed-upon pattern. If the matching fails, bytes 1-16 are read and compared, then 2-17, etc. In one embodiment, to make the search more efficient, single instruction multiple data (SIMD) instructions are used for the comparison. More specifically, Single SIMD Extension 3 (SSE3) instructions and extended multimedia (XMM) registers may be used which allow the comparison of 16 byte arrays in a single instruction (e.g., such as the PCMPEQW instruction).

4. Exchange Data:

Once the shared memory region 432 has been allocated and interrupt vectors have been swapped as described above, both partitions are ready to exchange information. The particular semantics of the inter-partition protocol depend on the particular application at hand. For instance, for network stack offloading, the shared memory area may be allocated into a transmit (Tx) and a receive (Rx) ring of buffers. Signaling may be a accomplished through inter-processor interrupts (IPIs) using the initial exchange of interrupt vectors, or via polling, in which case one or both sides monitor a particular memory location to determine data readiness.

Figure 4:
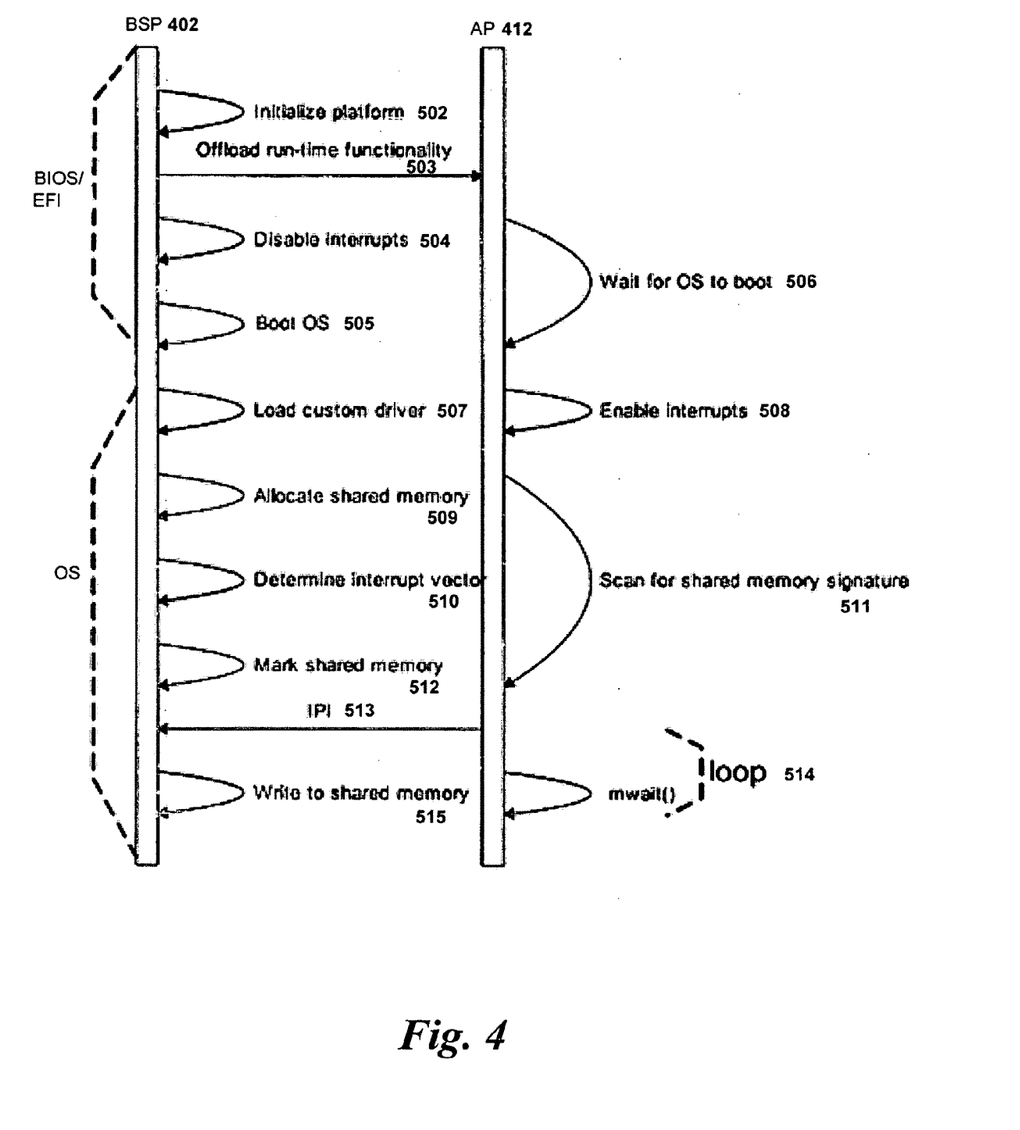
FIG. 4 illustrates an embodiment of the invention which includes a process for establishing communication between an OS partition and a sequestered partition.

The timing diagram illustrated in FIG. 4 depicts the interaction between the BSP 402 and the AP 412 that leads to the exchange of data between the OS and the S-Partition. In this example, the specialized code in the S-Partition sends IPIs to the OS and monitors memory writes to the shared area with the mwait instruction. The mwait instruction is a known SSE3 instruction used in combination with the monitor instruction for thread synchronization. The mwait instruction puts the processor into a special low-power/optimized state until a store, to any byte in the address range being monitored, is detected, or if there is an interrupt, exception, or fault that needs to be handled. In one embodiment, the S-partition sends an IPI to the OS to indicate data post processing. The OS writes to the memory range on which the S-partition is waiting (via the mwait instruction) to indicate data to be processed. A write operation causes the S-partition to break out of the blocking mwait instruction and continue processing the data. Thus, the sequestered AP 412 provides an isolated execution environment and the monitor/mwait instructions are used to implement the signaling mechanism between the S-partition 410 and the OS-Partition 400.

At 502, the BSP initializes the platform by performing basic BIOS operations (e.g., testing memory, etc). At 503, the BSP offloads runtime functionality by sequestering system resources as described above. For example, the BSP may remove entries from the memory map to sequester a block of memory and sequester the AP from the OS-Partition as described above. At 504, the BSP disables all interrupts (e.g., by raising the task priority level (TPL)) and at 505 the BSP boots the OS. At 506, the AP waits for the OS to boot. At 507, the BSP loads the custom driver 401 which, at 509, allocates the shared memory region 432. At 508, the AP enables interrupts so that it may communicate with the BSP using IPIs and, at 511, begins to scan the shared memory region for the unique byte pattern. At 510 the BSP determines the interrupt vector to be exchanged with the AP and stores it in shared memory. At 512, the BSP marks the shared memory with the unique pattern, which is then identified by the AP via the scanning process 511. At this stage the AP may communicate with and send IPIs to the BSP. The AP enters into a loop at 514 in which it waits for the BSP to write to shared memory. In one embodiment, this is accomplished with the monitor/mwait instructions mentioned above. The BSP writes to shared memory at 515 and the data is accessed by the AP.

Using the techniques described above, an additional, isolated execution environment is provided and monitor/mwait instructions may be used to implement the signaling mechanism between the S-partition and the OS.

Referring again to FIG. 1, the ICH 107 may be programmed to enable communication to a mock device. In this example, there are four physical devices 153, which for illustrative purposes are deemed to be network interface cards (NICs). Three of the NICs 153a, 153b and 153c are shown as sleeping in this illustration. The platform may be profiled to determine that these three NICs are underutilized and power may be saved by putting them to sleep. The data may then be routed only through NIC 153d. Thus, one NIC 153d is kept busy and three underutilized NICs are put to sleep, thereby resulting in an overall low power state 160. The mock hardware is posted because in some applications the various communications are required to have specific MAC or IP addresses. There is then an illusion that communication is utilizing four separate NICs. Four software stacks may be maintained with four unique MAC addresses to maintain this illusion via the network packets, although actual communication is passed through only one NIC.

The chipset may be programmed so that if any application attempts to communicate with one of the mock hardware devices 151a-c, representing real hardware 153a-c, then the communication is actually sent via an inter-partition bridge 161 to the real hardware 153d. If NIC 153d becomes saturated, then one of the NICS 153a-c may be awakened from sleep mode to offload some of the traffic.

The agents that take care of the routing may reside within the chipset in a machine with platform resource layer technology. The agent that catches these communications resides in the sequestered partition. When the system boots, firmware may initialize that loads these communication agents, as described above. Each sequestered agent may boot a different application or operating system. For instance one sequestered agent may be used for manageability software processes. Another sequestered agent may be used for a processor that is dedicated to an interactive user application, etc. The user is often not aware of the sequestered pieces of hardware.

When a process attempts to communicate with a peripheral component interconnect (PCI) device, a specific address is to be accessed. The I/O transaction is initiated to the specific address. The chipset (secondary ICH 107a) intercepts this I/O request and re-routes it to the appropriate active device 153d. This access in secondary ICH 107a may initiate an inter-process interrupt (IPI) which activates the sequestered agent in the sequestered device 153d. The sequestered agent may be a firmware or driver or application that has some special purpose. For the present discussion, the special purpose comprises a power management driver. The power management driver may be embodied within the firmware, OS driver, or proprietary driver.

By trapping the accesses to the alternate devices (i.e., NIC), one can shutdown or reduce the power being utilized by those slots and forward cycles to the sequestered complex which will proxy the I/O and other semantic data resulting in a net power savings for the platform. This is especially useful for platforms that have one or more out-of-band (OOB) add-on devices. These add-on OOB devices consume power regardless of the policies dictated by the user in the in-band OS that the user is actively using. For example, in many platforms being deployed in the near future, there are initiatives for active management with the use of an OOB set of devices. More information on one active management methodology may be found on the public Internet at URL www-intel-com/technology/manage/iamt/. Note that periods have been replaced by dashes to avoid inadvertent hyperlinks in URLs found in this document.

This methodology may be simulated using virtualization technology if the capability does not yet exist in the chipset. By virtualizing component access to simulate such soft-partitioning of a system, one can further simulate what is being described as a method for managing power state of sequestered device(s). The same basic logic can be applied to facilitate such solutions if the platform has the appropriate emulations established through a virtual machine monitor (VMM).

Figure 2A:
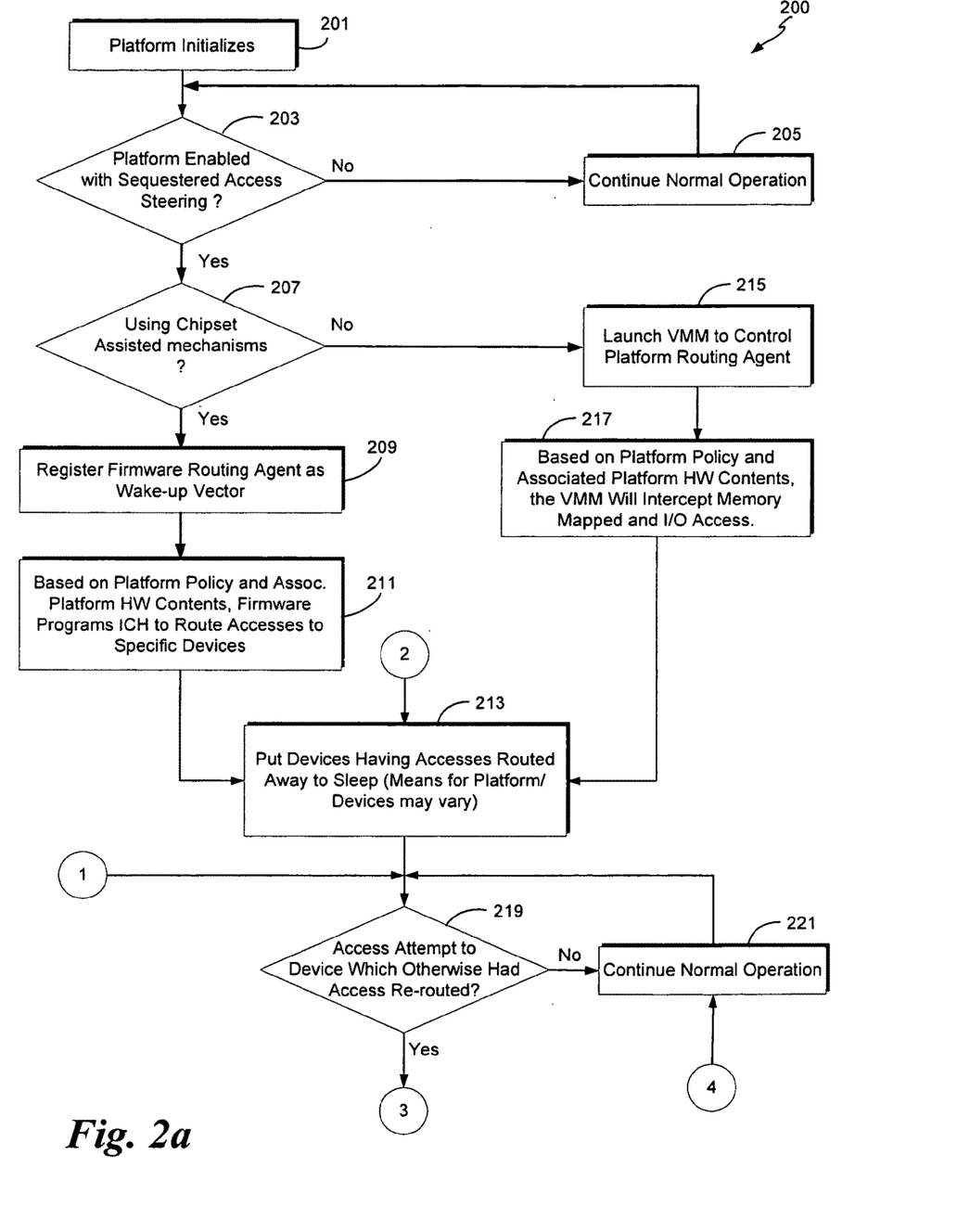
FIGS. 2a and 2b are flow diagrams illustrating a method for power utilization in partitioned environments, according to an embodiment of the invention.
Figure 2B:
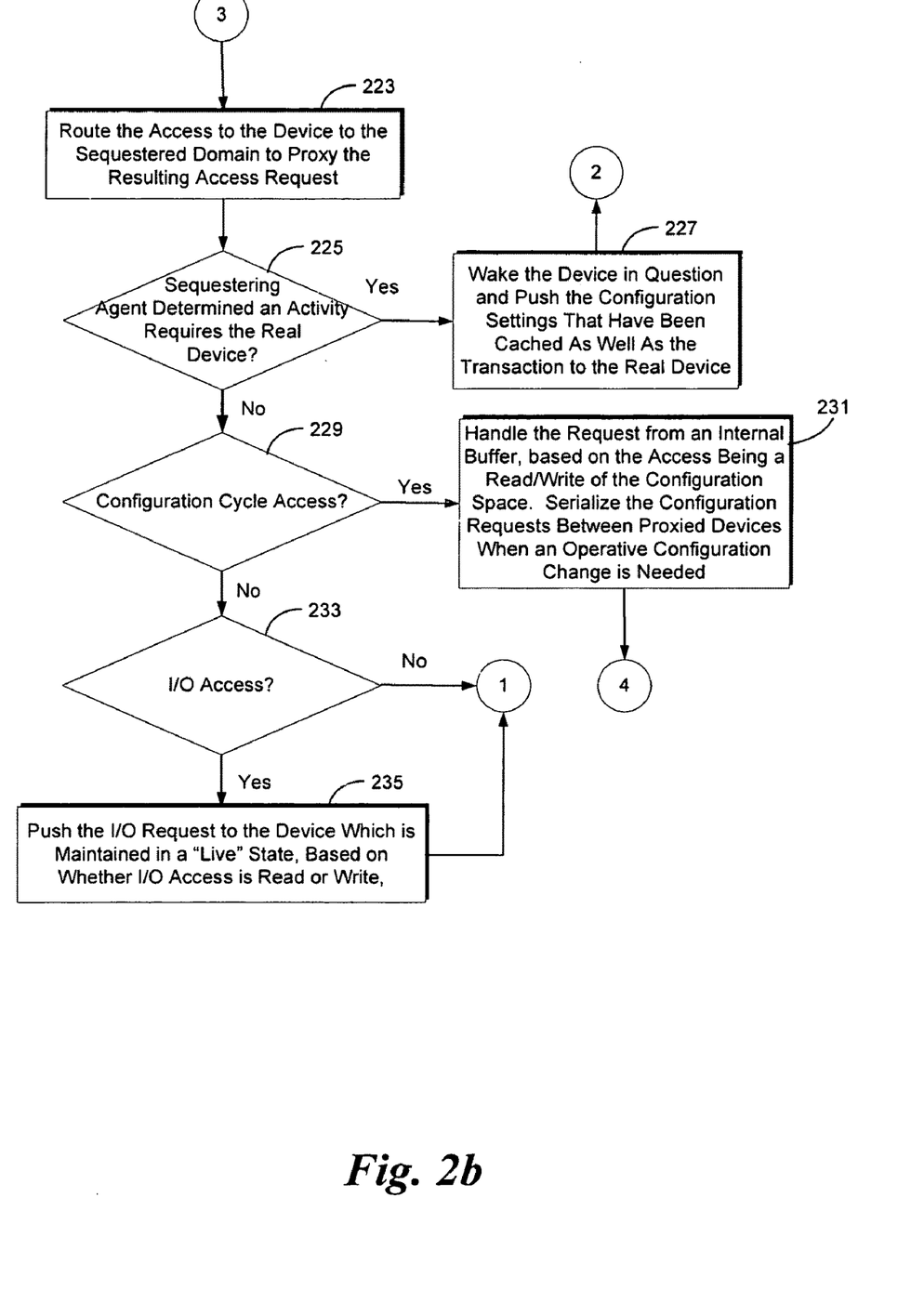

FIGS. 2a and 2b are flow diagrams illustrating a method 200 for power utilization in partitioned environments, according to an embodiment of the invention. First, the platform is initialized in block 201. A determination is made as to whether the platform is enabled with sequestered access steering, in decision block 203. If not, then the platform continues with normal operation, in block 205.

If the platform is enabled with sequestered access steering, then a determination is made as to whether there are chipset assisted mechanisms available, in decision block 207. If the platform uses chipset sequestering, then a firmware routing agent may be registered as a wake-up vector, in block 209. Thus, an agent is made available on the sequestered side which will receive attention upon an interrupt, where communication is effected via an inter-partition bridge. Based on platform policy and associated platform hardware contents, the firmware may program the ICH to route accesses to specific devices, in block 211. For instance, the specific devices may be PCI devices with memory mapped and I/O access. Devices having accesses routed away are then put in sleep mode, in block 213, to save power. It will be apparent to one of ordinary skill in the art that various devices may require differing methods to "sleep" the device. For instance, if the device is a NIC, the slot may be disabled or turned off, by cutting power to the slot. This capability is often available for plug-and-play, but may be used for power management according to embodiments of the invention. If the device is a processor, the processor may be put into a sleep state as defined by ACPI standards, or similar.

If the platform is using virtualization technology to effect the sequestering, then a virtual machine monitor (VMM) may be launched to control the platform routine agent, in block 215. Based on platform policy and associated platform hardware contents, the VMM intercepts memory mapped and I/O accesses, in block 217. Control passes to block 213, as described above for the chipset embodiment, to sleep specific devices.

Once the desired devices have been put into sleep mode, in block 213, a determination is made as to whether an access attempt has been made to a device which otherwise has had its accesses re-routed, in decision block 219. If not, then normal operation continues at blocks 221 before checking the access attempts again at block 219.

If the access attempt has been made to a re-routed device, then access to the device is routed to the sequestered domain to proxy the resulting access request, in block 223. A determination is made as to whether the sequestering agent determined that an activity requires the "real" device, in block 225. If activity cannot be routed through an alternative device, then the truly addressed device is awakened (taken out of sleep mode), in block 227. This may occur for several reasons, including that the sequestered device is saturated with activity and cannot handle another access request. The real device is brought out of sleep mode and the configuration settings that have been cached are pushed to the real device, as well as, the actual transaction (activity). Control then passes back to block 213 to sleep this device, as necessary.

If the sequestering agent determines that an alternative device may be used, then a determination is made as to whether the access is a configuration cycle access, in decision block 225. If so, then the request may be handled from an internal buffer, based on the access being a read/write of the configuration space, in block 231. The configuration requests are serialized between proxied devices when an operation configuration change is needed. A device may send/receive I/O for communication or it may receive configuration information. The configuration data may have been cached. Access requests may be handled from a buffer. Control then passes back to continued normal operations and waiting for the next access, in block 221.

If the access is not a configuration cycle access, as determined in decision block 229, then a determination is made as to whether the access is an I/O access in decision block 233. If so, then the I/O request is pushed to the device which is maintained in a "live" or "active" state, based on whether the I/O access is a read or write, in block 235. In both cases, control then passes back to decision block 219.

The techniques described herein are not limited to any particular hardware or software configuration; they may find applicability in any computing, consumer electronics, or processing environment. The techniques may be implemented in hardware, firmware, software, or a combination of the three. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a tangible carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method, comprising:
sequestering a first processing element of a plurality of processing elements in a platform from awareness by an operating system running on the platform to create a sequestered processing element;
selectively putting a second processing element of the plurality of processing elements in the platform into a lower power state to create a lower power state processing element; and
routing activity directed at the lower power state processing element to the sequestered processing element.

2. The method as recited in claim 1,
wherein the plurality of processing elements comprises a plurality of processor cores.

3. The method as recited in claim 2, further comprising:
communicating between an operating system (OS) aware partition of which the operating system is aware and a sequestered partition of which the operating system is unaware, the sequestered partition comprising the sequestered processing element, the OS aware partition comprising at least one processing element not in the sequestered partition, the communicating to facilitate routing activity to maintain a preferred level of power utilization in the platform.

4. The method as recited in claim 3, further comprising:
selectively waking and sleeping processing elements of the plurality of processing elements to minimize power utilization in the platform, wherein a sleeping processing element uses less power than a wakeful processing element.

5. The method as recited in claim 3, wherein activity is routed to one of a processing element in the OS aware partition and the sequestered partition, based on platform policy.

6. The method as recited in claim 5,
wherein platform policy determines that activity is routed through one of a virtual machine monitor and an inter-partition bridge.

7. The method as recited in claim 5,
wherein platform policy determines the selection of the lower power state processing element from the plurality of processing elements and selection of the sequestered processing element from the plurality of processing elements.

8. A system comprising:
a platform comprising a plurality of processing elements;
a sequestered partition on the platform, an operating system (OS) running on the platform being unaware of the sequestered partition, the sequestered partition comprising at least one sequestered processing element of the plurality of processing elements;
an OS partition on the platform, the operating system running on the platform being aware of the OS partition, the OS partition comprising at least one of the plurality of processing elements not in the sequestered partition;
an agent to forward incoming and/or outgoing data traffic to an available processing element in the sequestered partition when a requested processing element in the OS partition is in sleep mode; and
a power management driver to selectively transition one or more of the plurality of processing elements to/from sleep mode to maintain a preferred level of power utilization within the platform.

9. The system as recited in claim 8,
wherein the plurality of processing elements comprises a plurality of processor cores.

10. The system as recited in claim 9,
wherein the agent is initiated by a chipset of the platform, the chipset to identify activity directed at sleeping processing elements to be routed to a wakeful processing element.

11. The system as recited in claim 10, wherein the chipset is to generate an inter-process interrupt to initiate the agent.

12. The system as recited in claim 9,
wherein the agent is initiated by a virtual machine monitor (VMM) of the platform, the VMM to identify activity directed at a sleeping processing elements to be routed to a wakeful processing element.

13. A non-transitory machine readable storage medium having instructions that when executed cause a machine to:
sequester a first processing element of a plurality of processing elements in a platform from awareness by an operating system running in the platform to create a sequestered processing element;
selectively put a second processing element of the plurality of processing elements in the platform into a lower power state to create a lower power state processing element; and
route activity directed at the lower power state processing element to the sequestered processing element.

14. The medium as recited in claim 13,
wherein the plurality of processing elements comprises a plurality of processor cores.

15. The medium as recited in claim 14,
wherein the instructions further cause the machine to:
communicate between an operating system (OS) aware partition of which the operating system is aware and a sequestered partition of which the operating system is unaware, the sequestered partition comprising the sequestered processing element, the OS aware partition comprising at least one processing element not in the sequestered partition, the instructions to communicate facilitating routing activity to maintain a preferred level of power utilization in the platform.

16. The medium as recited in claim 15, wherein the instructions further cause the machine to:
selectively wake and sleep processing elements to minimize power utilization in the platform, wherein a sleeping processing element uses less power than a wakeful processing element.

17. The medium as recited in claim 15, wherein activity is routed to one of a processing element in the OS aware partition and the sequestered partition, based on platform policy.

18. The medium as recited in claim 17, wherein platform policy determines that activity is routed through one of a virtual machine monitor and an inter-partition bridge.

19. The medium as recited in claim 17, wherein platform policy determines the selection of the lower power state processing element from the plurality of processing elements and selection of the sequestered processing element from the plurality of processing elements.

* * * * *